F. MUNSEY.
PLOW.
APPLICATION FILED SEPT. 23, 1914.
1,216,836.
Patented Feb. 20, 1917.
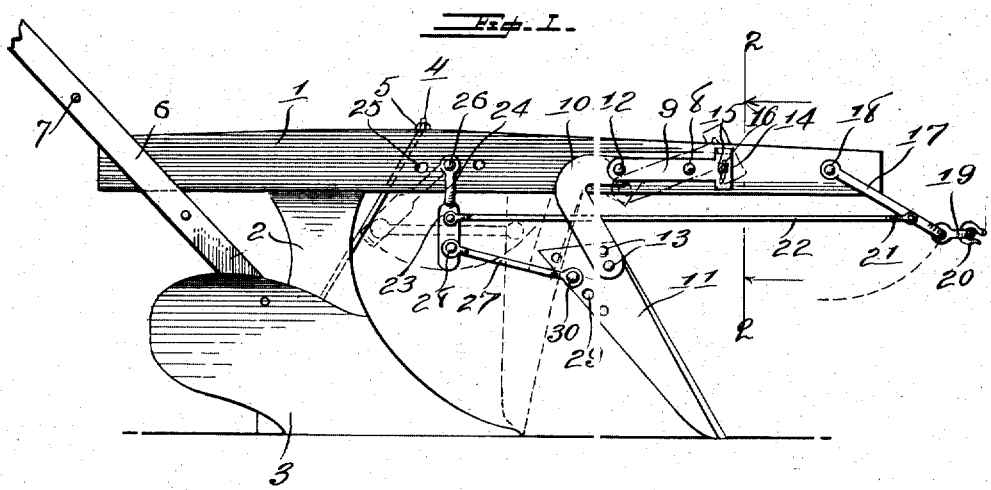
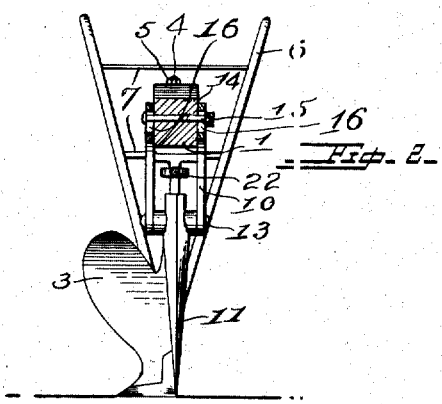
Witnesses
Edw. S. Hall.
Wm. H. Downing.
Inventor
Frank Munsey.
By Richard B. Owen.
Attorney

UNITED STATES PATENT OFFICE.

FRANK MUNSEY, OF PERSIA, TENNESSEE.

PLOW.

1,216,836.  Specification of Letters Patent.  Patented Feb. 20, 1917.

Application filed September 23, 1914. Serial No. 863,167.

*To all whom it may concern:*

Be it known that I, FRANK MUNSEY, a citizen of the United States, residing at Persia, in the county of Hawkins and State of Tennessee, have invented certain new and useful Improvements in Plows, of which the following is a specification.

My invention relates to plows.

The primary object of my invention resides in the provision of a novel cutting means associated with the beam of a plow for facilitating the effective operation of the plow in the ground, the cutting means having novel means associated therewith for allowing the same to be moved into engagement with a plow share carried by the beam when the cutting means engages a rigid object in the ground for facilitating the uninterrupted progress of the plow.

Another object of my invention resides in the provision of a novel means for mounting the cutting means which in this instance is in the form of a colter, the mounting means being removably connected with the beam of a plow for varying the pitch of the colter to the ground without disconnecting any of the parts.

A further object of my invention resides in the provision of a novel means for adjustably connecting the cutting means with the means for operating the latter for varying the pitch of the cutting means or colter to the ground and also provides novel means for facilitating the adjustable mounting of the operating means.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 is a side elevational view of my invention, the dotted lines showing the position assumed by the colter when the bit thereof comes in contact with a rigid object.

Fig. 2 is a transverse sectional view taken on the line 2—2 of Fig. 1.

Referring more particularly to the drawings in which similar reference numerals designate like or corresponding parts throughout the different views, I provide a beam 1 formed preferably of wood, though not necessarily, which beam has a standard 2 depending from the point adjacent the rear end thereof, the standard having a plow share 3 rigidly connected to the lower end thereof for engagement with the ground. A brace rod 4 is provided to aid the securement of the standard and share to the beam, the respective ends of which rod are engaged by nuts 5, only one of which is shown in the drawings. In order to guide the plow during movement and to facilitate the efficient operation of the same, I have provided handles 6, the inner ends of which are rigidly connected to the plow share from which point the handles diverge rearwardly, the handles being connected by suitable cross pieces 7 for strengthening the same.

Pivotally mounted on the sides of the beam at a point substantially midway the forward end of the beam and the standard 2, by means of a suitable fastening device, preferably a bolt 8 are a pair of T-shaped supporting plates 9, the offset ends being positioned adjacent the forward end of the beam, the opposite or rear ends of which plates have pivotally connected thereto my improved colter. The colter in this instance comprises a head formed of angularly bent head plates 10 and a substantially triangular bit 11 carried thereby. Bolts 12 are extended through the rear ends of the T-shaped plates 9 and arranged in engagement with the upper ends of the head plates 10 for pivotally connecting the latter thereto, the lower ends of the head plates having their forward marginal edge arranged in alinement with the upper end of the cutting edge of the colter and rigidly secured thereto by suitable fastening devices preferably rivets 13. In order to vary the pitch of the colter to the ground, I have connected the offset portions of the T-shaped plates by means of a bolt 14 and a nut 15, the bolt operating in the arcuate slots 16 in the plates. By this arrangement the disconnecting of any of the parts for varying the pitch is obviated.

Suitable draft actuating means has been provided for causing the colter to assume a position for facilitating the uninterrupted progress of the plow and in this instance consists essentially of a draft clevis 17 pivotally mounted on the forward end of the beam by a suitable fastening device 18, the clevis having a link 19 movably mounted on its vertex for facilitating the removable engagement of a draft device 20. Pivotally connected to the opposite sides of the clevis as indicated by the numeral 21 is a connecting rod 22, the latter terminating in a forked extension which is pivotally connected to the depending elongated ear 23, the ear being carried by a clevis 24, which is pivotally and adjustably mounted in one of the openings 25 in the beam by means of a suitable fastening device 26. In order to vary the pitch of the colter to the ground to a greater extent than that capable of the adjusting arrangement of the T-shaped plates 9, I have provided a link 27, the respective ends of which are bifurcated and pivotally mounted in the adjacent lower end of the ear 23 by means of a suitable fastening device 28 and in one of the uniformly spaced openings 29 in the colter bit 11 by means of a suitable fastening device 30. In order to facilitate the efficient operation of the colter when the same comes in contact with a rigid object, I have found it expedient to arrange the lower substantially pointed end of the plow share 3 so that the point of the share will be arranged in alinement with the cutting edge of the colter bit, the share also serving as a brace for the bit.

The operation of my invention is as follows:

When the colter 11 which clears a passage for the plow share during the forward movement of the latter comes in contact with a rigid object on the ground, the bit will be forced backward and placed into engagement with the lower end of the plow share as shown in the dotted lines in Fig. 1. Simultaneous with this movement the clevis 17 will assume a position as shown in dotted lines in Fig. 1, the clevis 23, rod 22 and link 27 will assume the positions as shown in dotted lines. Because of the arrangement of this operating mechanism, the forward movement of the plow will be uninterrupted. The bit 11 will, after coming in contact with the plow share, ride upon the objects and pass over the latter, whereupon the link 17 will assume its normal position simultaneously causing the bit to assume its normal position.

Although I have shown and described the preferred embodiment of my invention, I desire to be understood that I am not limited to the exact details shown; however, great stress is laid upon the arrangement and construction of the colter and having the operating mechanism associated therewith for facilitating the efficient operation of the plow.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A colter including a head and a bit, means for adjustably mounting the head, and draft actuating means adjustably connected to the bit for allowing the bit to move rearwardly when it engages a rigid object in the ground.

2. A colter including a head and a bit, means for adjustably mounting the head, movably and adjustably mounted draft actuating means associated with the bit for allowing the bit to move rearwardly when it engages a rigid object in the ground.

3. A colter including a head and a bit, means for adjustably mounting the head, a movably mounted clevis positioned in advance of the bit, a movably and adjustably mounted clevis positioned in the rear of the bit, a rod pivotally connected at its respective extremities to the clevis, and a link pivotally connected to the rear clevis and adjustably and pivotally connected to the bit, substantially as described and for the purpose set forth.

4. A colter including a head and a bit, means for adjustably and pivotally mounting the head, draft actuating means including pivotally mounted clevises, a rod having its respective extremities pivotally connected to the clevises to permit of the clevises to move simultaneously, a link pivotally connected to the rear clevis and adjustably associated with the bit to permit the bit to move rearwardly when it engages a rigid object in the ground, substantially as described and for the purpose set forth.

5. A colter including head plates and a bit rigidly connected therebetween, pivotally and adjustably mounted supporting plates, means for pivotally connecting the head plates to the rear ends of the supporting plates, draft actuating means including pivotally mounted clevises, a connected rod arranged between the two clevises to cause them to move simultaneously, a link pivotally connected to the rear clevis and pivotally and adjustably connected to the bit to allow the bit to move rearwardly when it engages a rigid object in the ground, and the rear clevis being adjustable to vary the pitch of the bit to the ground, substantially as described and for the purpose set forth.

In testimony whereof I affix my signature in presence of two witnesses.

FRANK MUNSEY.

Witnesses:
B. R. MELISE,
K. A. LANFORD.

Copies of this patent may be obtained for five cents each, by addressing the "Commissioner of Patents, Washington, D. C."